US012589717B2

(12) United States Patent
Bojjanapalli

(10) Patent No.: US 12,589,717 B2
(45) Date of Patent: Mar. 31, 2026

(54) LIQUID LEVEL SENSING FOR WASHER FLUID RESERVOIR

(71) Applicant: Rosemount Aerospace Inc., Burnsville, MN (US)

(72) Inventor: Muralidhar Rao Bojjanapalli, Hyderabad (IN)

(73) Assignee: Rosemount Aerospace Inc., Burnsville, MN (US)

( * ) Notice: Subject to any disclaimer, the term of this patent is extended or adjusted under 35 U.S.C. 154(b) by 319 days.

(21) Appl. No.: 18/239,845

(22) Filed: Aug. 30, 2023

(65) Prior Publication Data

US 2024/0351557 A1      Oct. 24, 2024

(51) Int. Cl.
| | |
|---|---|
| *B60S 1/48* | (2006.01) |
| *B60S 1/52* | (2006.01) |
| *G01F 23/00* | (2022.01) |

(52) U.S. Cl.
CPC .............. *B60S 1/486* (2013.01); *B60S 1/524* (2013.01); *G01F 23/0007* (2013.01)

(58) Field of Classification Search
CPC .......... B60S 1/486; B60S 1/524; B60S 1/522; B60S 1/483; B60S 1/50; G01F 23/0007
See application file for complete search history.

(56) References Cited

U.S. PATENT DOCUMENTS

| | | |
|---|---|---|
| 2,153,519 A | 4/1939 | Horton |
| 3,443,759 A | 5/1969 | Hanselmann |
| 3,703,017 A * | 11/1972 | Edwards ................. B60S 1/483 |
| | | 15/250.02 |
| 2015/0078940 A1* | 3/2015 | Kikuta .................... F04B 17/03 |
| | | 417/443 |
| 2020/0130651 A1* | 4/2020 | Waible ...................... B60S 1/50 |

FOREIGN PATENT DOCUMENTS

| | | |
|---|---|---|
| CN | 112678145 A | 4/2021 |
| GB | 750735 A | 6/1956 |
| JP | 3206260 B2 | 9/2001 |
| WO | 9108933 A1 | 6/1991 |

OTHER PUBLICATIONS

European Patent Office, Extended European Search Report received in EP Application No. 24170821.3, Sep. 12, 2024, 8 pages.

* cited by examiner

*Primary Examiner* — Andrew A Horton
(74) *Attorney, Agent, or Firm* — Suiter Swantz IP

(57) ABSTRACT

In accordance with at least one aspect of this disclosure, a system includes a wiper system having at least one wiper arm configured to wipe a windshield of a vehicle, a reservoir configured to hold washer fluid, and a fluid line fluidly connected between the reservoir and the wiper system configured to provide the jet of washer fluid from an outlet of the reservoir to the wiper arm for spraying onto the windshield. The reservoir includes, an interior volume having an outlet, and a piston configured to force the washer fluid through the outlet to produce a jet of washer fluid at the outlet.

16 Claims, 4 Drawing Sheets

LIQUID LEVEL SENSING FOR WASHER FLUID RESERVOIR

CROSS REFERENCE TO RELATED APPLICATIONS

This application claims priority to Indian Provisional Patent Application No. 202341028562, filed Apr. 19, 2023, the entire content of which is incorporated herein by reference.

TECHNICAL FIELD

The present disclosure relates to liquid level sensing and more particularly to liquid level sensing for a washer fluid reservoir.

BACKGROUND

Windshield wiper and wash systems remove dirt, water and snow from the windshield of a vehicle (e.g., an aircraft) provide a clear view through the windshield in no rain conditions. The fluid availability in the wash reservoir should be accurately indicated to ensure the availability of windshield cleaning system when needed for cleaning, and for wiper fluid management during visibility critical situations, if any.

The conventional techniques have been considered satisfactory for their intended purpose. However, there is an ever present need for improved systems and methods for sensing the liquid level in the washer fluid reservoir to accurately provide information to vehicle pilots. This disclosure provides a solution for this need.

SUMMARY

In accordance with at least one aspect of this disclosure, a system includes a wiper system having at least one wiper arm configured to wipe a windshield of a vehicle, a reservoir configured to hold washer fluid, and a fluid line fluidly connected between the reservoir and the wiper system configured to provide the jet of washer fluid from an outlet of the reservoir to the wiper arm for spraying onto the windshield. The reservoir includes, an interior volume having an outlet, and a piston configured to force the washer fluid through the outlet to produce a jet of washer fluid at the outlet.

In embodiments, the piston can include a first side and a second side opposite the first side of the piston. The first side of the piston can is configured to be in contact with free space in the interior volume and the second side of the piston is configured to be in contact with a surface of the washer fluid.

The piston is configured such that the second side of the piston is configured to be in contact with the surface of the washer fluid during a maneuver of the vehicle. In certain embodiments, the maneuver of the vehicle can include one or more of rolling, pitching, and/or yawing, and the vehicle can include an aircraft.

In embodiments, the system can include a position sensor disposed on the piston configured to sense a position of the piston within the interior volume. The position sensor can be disposed on the second side of the piston such that the position sensor corresponds to a liquid level of the washer fluid in the reservoir.

A motor can be operatively connected to drive the piston via a drive shaft. The motor can be configured to rotate the drive shaft to drive the piston along the drive shaft between a first position and a second position.

A controller can be operatively connected to control the motor in response to user input calling for washer fluid. In embodiments, the controller can be configured to continually measure the liquid level of the washer fluid in the reservoir as the motor drives the piston from the first position to the second position in response to the user input. In embodiments, the controller can be configured to continuously calibrate to indicate a volume of washer fluid in the reservoir at every position of the piston In embodiments, the piston can include a relief channel extending from the first side to the second side of the piston to allow air on the second side of the piston, above the surface of the washer fluid, to escape to the first side of the piston as the motor drives the piston to meet the surface of the washer fluid, e.g., during initial filling and/or calibration of the system. In certain embodiments, a state of the relief channel can be actively controlled.

In embodiments, one or more bearings can be disposed on the drive shaft to facilitate rotation of the drive shaft.

In embodiments, the piston can include one or more sealing surfaces configured to interface with an inner surface of the interior volume to prevent washer fluid from passing from the second side of the piston, around the piston to the first side of the piston. In certain embodiments, the one or more sealing surfaces can include a seal disposed thereon.

In embodiments, the reservoir can also include a fluid valve disposed at the outlet of the reservoir configured to meter the jet of washer fluid at the outlet of the reservoir. The reservoir can include an inlet configured to fluidly communicate a fluid source to the interior volume for filling of the reservoir.

In embodiments, the wiper arm can include one or more fluid outlets (e.g., nozzle outlets) in fluid communication with the fluid line configured to issue the jet of washer fluid from the one or more fluid outlets onto the windshield.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein.

DETAILED DESCRIPTION

Figure 1:
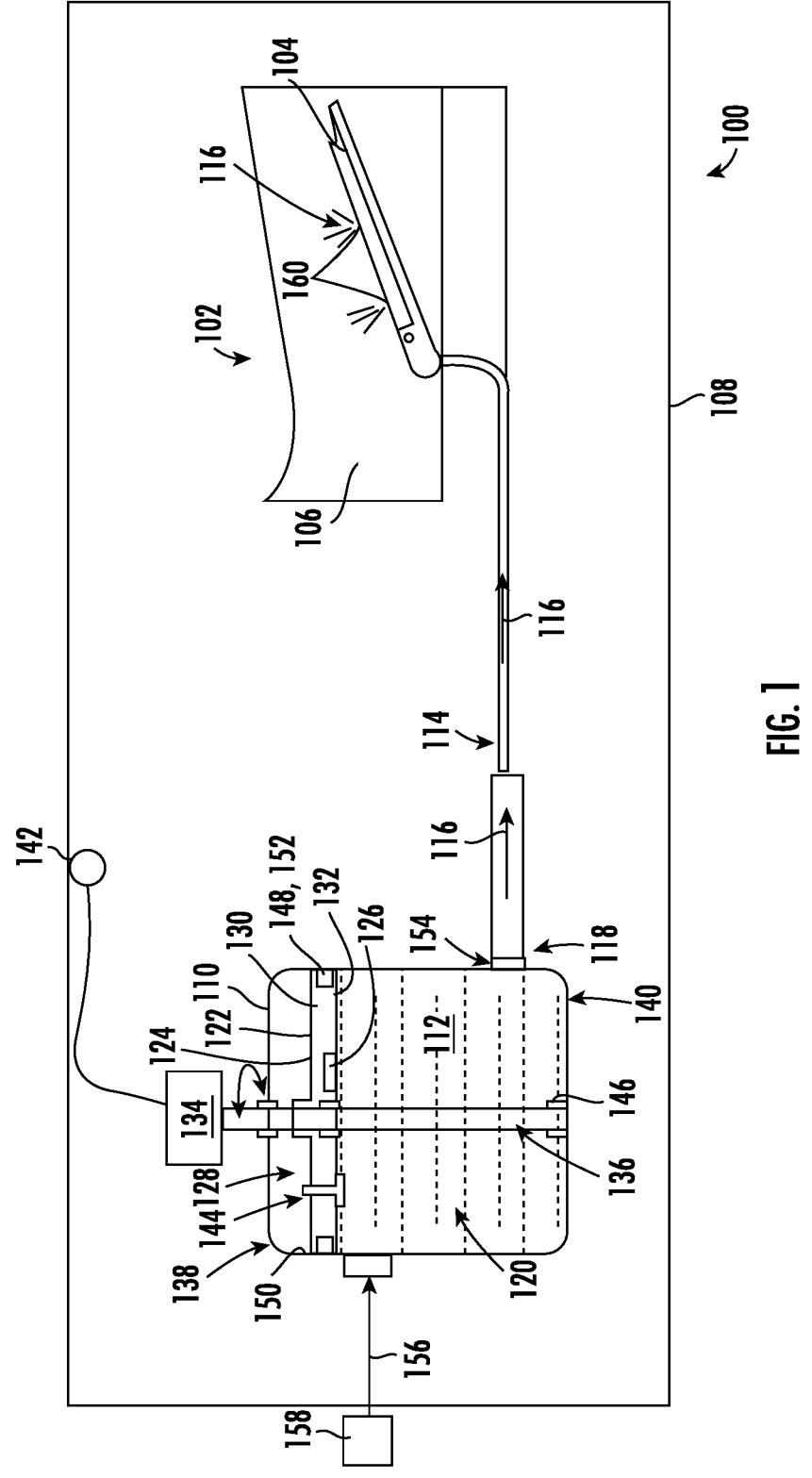
FIG. 1 is a schematic diagram of an embodiment of a system in accordance with this disclosure, showing a wiper washing system.
Figure 3:
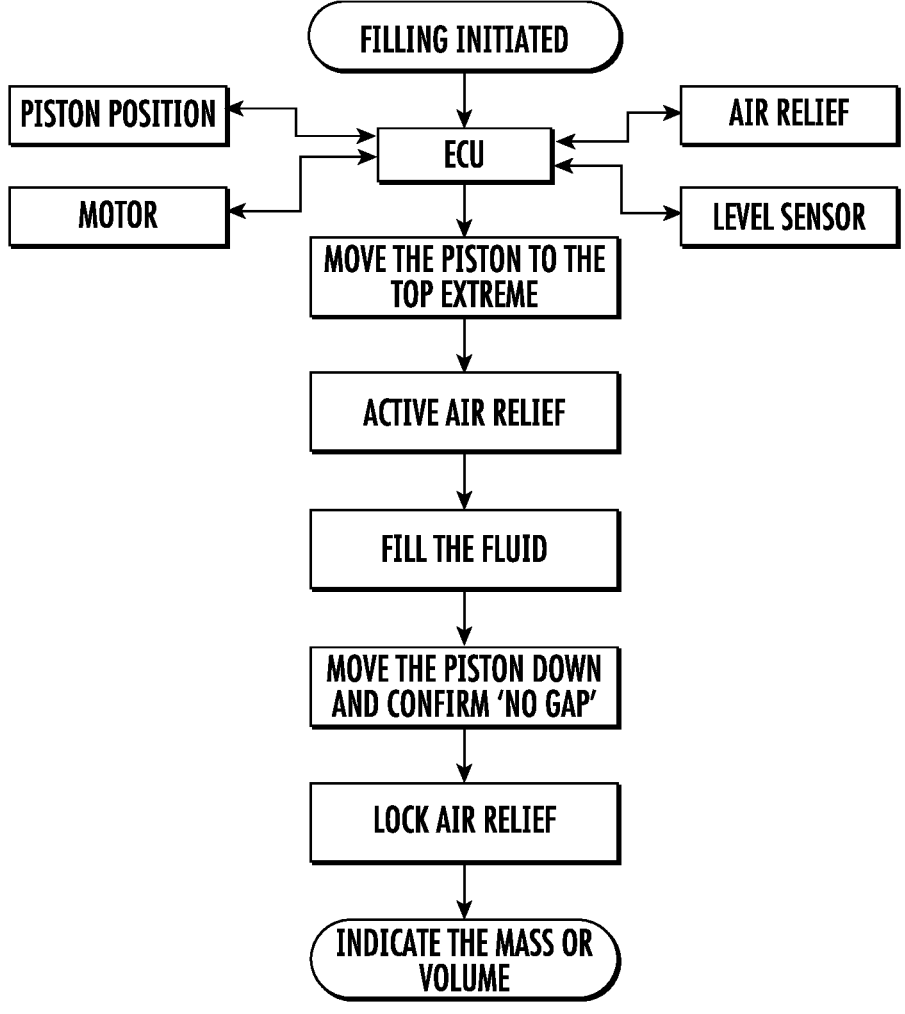
FIG. 3 is a flow chart diagram of a method of filling the wiper wash system.
Figure 4:
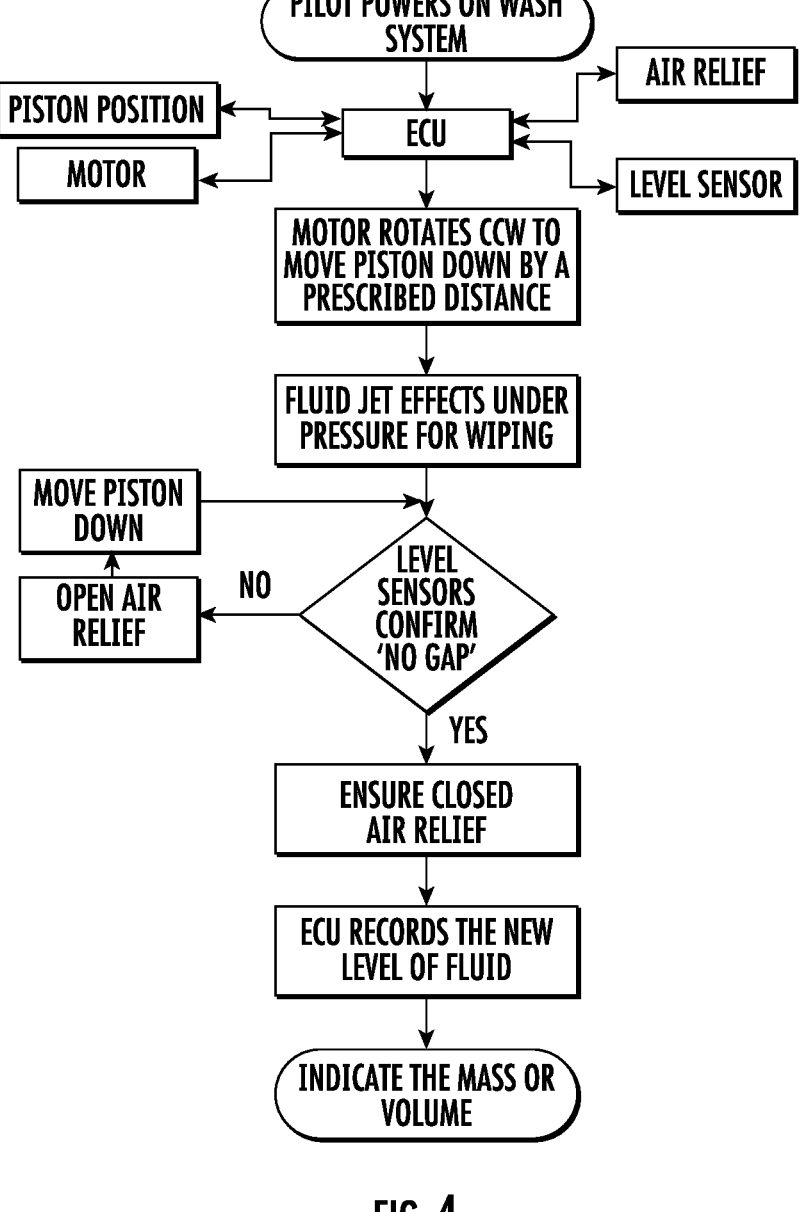
FIG. 4 is a flow chart diagram of a method of operating the wiper wash system.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-4.

Conventional wash systems for windshield wiper systems contains a fluid reservoir and a pump (e.g., an electrically operated pump) to supply cleaning fluid in the form of two or more jets for spraying on the windshield. A small centrifugal pump is typically fixed directly on to the fluid reservoir or fitted in the hydraulic line and the pump is controlled by a switch, operated by a vehicle operator (e.g., a pilot).

In the example of aircraft, the orientation of the fluid reservoir dynamically changes during a flight due to maneuvering, for example during roll, pitch, or yaw, and thus the fluid volume can take a different shape, dynamically as the maneuver occurs, even if the change in shape is momentary. Because of this, as well as sloshing within the reservoir, it can be challenging to accurately measure or sense the liquid level in the washer fluid reservoir. Embodiments of a system 100 as described herein provide accurate and continuous measurement of cleaning fluid level in the reservoir. Accurate measurement of the washer fluid is important for facilitating the timely refilling and fluid crisis management during a flight.

In accordance with at least one aspect of this disclosure, the system 100 can include a wiper system 102 having at least one wiper arm 104 configured to wipe a windshield 106 of a vehicle 108. The system 100 can include a reservoir 110 configured to hold washer fluid 112, and a fluid line 114 fluidly connected between the reservoir 110 and the wiper system 102 configured to provide a jet 116 of washer fluid from an outlet 118 of the reservoir 110 to the wiper arm 104 for spraying onto the windshield 106. The reservoir 110 can include, an interior volume 120 fluidly connected to the outlet 118, and a piston 122 configured to force the washer fluid 112 through the outlet 118 to produce the jet 116 of washer fluid at the outlet 118 and through the fluid line 114.

In embodiments, the piston 122 can include a first side 124 and a second side 126 opposite the first side 124. The first side 124 of the piston 122 is configured to be in contact with free space 128 in the interior volume 120 and the second side 126 of the piston 122 is configured to be in contact with a surface 130 of the washer fluid 112.

Figures 2A, 2B, 2C:
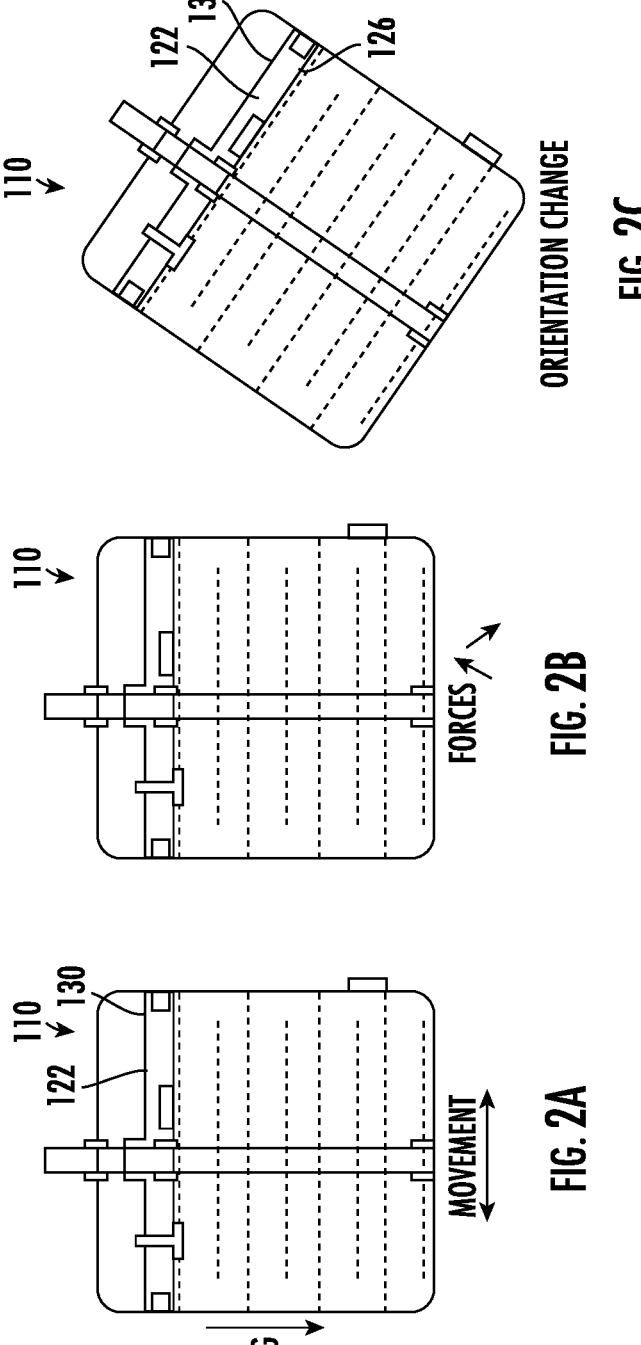
FIGS. 2A-2C show the reservoir of the wiper washer system of FIG. 1 under different forces and/or in different orientations.

The piston 122 can be configured such that the second side 126 of the piston is configured to be in contact with the surface 130 of the washer fluid 112 during a maneuver of the vehicle 108, for example as shown in FIGS. 2A-2C. In certain embodiments, the maneuver of the vehicle 108 can include one or more of rolling, pitching, and/or yawing, for example, if the vehicle 108 is an aircraft. FIG. 2A shows side to side movement of the reservoir 110, FIG. 2B shows upwards and downwards forces acting on the washer fluid 112 in the reservoir 110, relative to the direction of gravity G, and FIG. 2C shows the surface 130 of the fluid 112 remaining in contact with the second side 126 of the piston 122 during an orientation chance, such as rolling. Because the piston 122 always in contact with the upper surface 130 of the washer fluid 112, this ensures that the washer fluid 112 is always available to be provided to the wiper arm 102 no matter the maneuver, assuming there is still fluid 112 in the reservoir 110. This configuration can also eliminate other forces acting on the washer fluid 112, for example forces that would cause the fluid 112 to slosh in the reservoir 110, making the liquid level determination much simpler by corresponding the liquid level to the position of the piston 122, as described below.

In embodiments, the system 100 can include a position sensor 132 disposed on the piston 122 configured to sense a position of the piston 122 within the interior volume 120. The position sensor 132 can be disposed on the second side 126 of the piston 122 such that the position sensor 132, and thus the position of the piston, corresponds to the liquid level of the washer fluid 112 in the reservoir 110.

A motor 134 can be operatively connected to drive the piston 122 via a drive shaft 136. The motor 134 can be configured to rotate the drive shaft 136 to drive the piston 122 along the drive shaft 136 between a first position (full reservoir) and a second position (empty reservoir), and any position therebetween. A controller 142 can be operatively connected to control the motor 134 in response to user input calling for washer fluid 112 (e.g., a pilot activating a switch in the cockpit).

In embodiments, the controller 142 can be configured to continually measure the liquid level of the washer fluid 112 in the reservoir 110 as the motor 134 drives the piston 122 from the first position to the second position in response to the user input.

In embodiments, the piston 122 can include a relief channel 144 extending from the first side 124 to the second side 126 of the piston 122 to allow air on the second side 126 of the piston, above the surface 130 of the washer fluid 112, to escape to the first side 124 of the piston 122 as the motor 134 drives the piston 122 to meet the surface 130 of the washer fluid, e.g., during initial filling and/or calibration of the system 100. In certain embodiments, a state of the relief channel (e.g., open or closed) can be actively controlled by the controller 134, for example, so that once initial filling is complete, the relief channel 144 can be commanded closed so that washer fluid 112 does not escape through the channel 144 during operation of the system 100. In embodiments, one or more bearings 146 can be disposed on the drive shaft 136 to facilitate rotation of the drive shaft 136.

In embodiments, the piston 122 can include one or more sealing surfaces 148 configured to interface with an inner surface 150 of the interior volume 120 to prevent washer fluid 1120 from passing from the second side 126 of the piston 122, around the piston 122 to the first side 124 of the piston 122. In certain embodiments, the one or more sealing surfaces 150 can include a seal 152 disposed thereon.

In embodiments, the reservoir 110 can also include a fluid valve 154 disposed at the outlet 118 of the reservoir 110 configured to meter the jet 116 of washer fluid at the outlet 118 of the reservoir 110. The reservoir 110 can include an inlet 156 configured to fluidly communicate a fluid source 158 to the interior volume 120 for filling of the reservoir 110. The fluid source 158 can be external to the vehicle.

In embodiments, the wiper arm 104 can include one or more fluid outlets 160 (e.g., nozzle outlets) in fluid communication with the fluid line 114 configured to issue the jet 116 of washer fluid from the one or more fluid outlets 160 onto the windshield 108.

Embodiments include a reservoir and related components designed so that the fluid mass inside the reservoir is maintained in a regular shape and maintained stable without sloshing, despite the external forces and maneuvering orientations. Thus, accurate measurement of the fluid remaining in the reservoir can be achieved by keeping the fluid in a volume-changing container according to the volume of the fluid left in the reservoir, where the volume of the reservoir is made to change in line with the fluid remaining in the reservoir.

Embodiments include a fluid reservoir fitted with a piston. This piston can include one or more seals to avoid any leakage into the back side of the piston. The piston can be mounted on a shaft (e.g., a piston rod), where the piston is configured to slide along the piston rod via rotation of the rod. The rod can include any suitable configuration, such as a threaded rod. The piston rod can rotate but does not traverse axially. For any dynamic position of the piston in the reservoir, the remaining volume of fluid can be calibrated for indication, along the height of the reservoir. This piston rod can be coupled to a motor shaft and the motor can operate in both a counter clockwise and a clockwise direction. The outlet port for the pressurized fluid from the reservoir can be employed with a pressure valve and the inlet filling port can be positioned to avoid backflow. The inlet can also be fitted with a suitable valve. A level sensor(s) can be attached to the piston on the fluid side (e.g., the second side 126). A relief valve can be provided to tap off air entrapped, as needed.

With reference now to FIG. 3 when the fluid is to be filled in the reservoir, the piston is drawn upwards (fully), by rotating the motor clockwise, and the fluid is filled, either partially or completely (as needed for a given mission), while the air-relief channel is activated. After filling is done, the piston is moved downward, towards the fluid by rotating the motor counter clockwise. The piston moves until it contacts the fluid surface through the level sensors and signals to the motor (e.g., through the controller) to stop moving the piston to avoid any fluid compression. Once the piston is in contact with the fluid surface, the air-relief will be closed. Any position (e.g., an amount of travel from zero/minimum volume reference) of the piston in the reservoir can be calibrated to represent the fluid volume in the reservoir at the time of initial filling. Thus, the reservoir filling is executed, and the volume filled is measured by reading the piston position on reservoir. In this condition, the fluid is packed between the reservoir and piston without any gap as shown in FIGS. 1-2C. In such a condition, the fluid in the tank remains undisturbed in its shape under any maneuvering/external forces as shown in FIGS. 2A-2C.

Referring now to FIG. 4, when the pilot operates the wash system 100, a command from the pilot goes to the controller and the controller controls the motor to move the piston down as prescribed. Fluid exits the tank under pressure through outlet pressure valve, to the extent of piston displaced volume. The fluid is driven only to the extent of piston movement. Thus, the new position of the piston indicates the remaining volume in the reservoir as per the calibration performed by the controller. Accordingly, the controller is configured to calibrate continuously to indicate volume at every position of piston. Thus, the piston will be in contact with the fluid, without having any gap in the fluid container. Therefore, the active volume of reservoir (e.g., fluid-side) will always remain full, at any given instance, which avoids fluid sloshing in the reservoir and enables the wash system 100 to sense the fluid level at any given instance. Embodiments allow the fluid to be available and capable of being supplied to the windshield at all times and at higher pressure rates, if needed.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "controller." A "circuit," "module," or "controller" can include one or more portions of one or more separate physical hardware and/or software components that can together perform the disclosed function of the "circuit," "module," or "controller", or a "circuit," "module," or "controller" can be a single self-contained unit (e.g., of hardware and/or software). Furthermore, aspects of this disclosure may take the form of a computer program product embodied in one or more computer readable medium(s) having computer readable program code embodied thereon.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:

a wiper system having at least one wiper arm configured to wipe a windshield of a vehicle;

a reservoir configured to hold washer fluid, the reservoir comprising:

an interior volume having an outlet;

a piston configured to force the washer fluid through the outlet to produce a jet of washer fluid at the outlet, wherein the piston includes a first side and a second side opposite the first side of the piston, wherein the first side of the piston is configured to be in contact with free space in the interior volume and the second side of the piston is configured to be in contact with a surface of the washer fluid; and a position sensor disposed on the piston configured to sense a position of the piston within the interior volume, wherein the position sensor is disposed on the second side of the piston such that the position sensor corresponds to a liquid level of the washer fluid in the reservoir; and a fluid line fluidly connected between the reservoir and the wiper system configured to provide the jet of washer fluid from the outlet of the reservoir to the at least one wiper arm for spraying onto the windshield.

2. The system of claim 1, wherein the second side of the piston is configured to be in contact with the surface of the washer fluid during a maneuver of the vehicle.

3. The system of claim 2, wherein the maneuver of the vehicle includes one or more of rolling, pitching, and/or yawing.

4. The system of claim 1, further comprising a motor operatively connected to drive the piston via a drive shaft, the motor configured to rotate the drive shaft to drive the piston along the drive shaft between a first position and a second position.

5. The system of claim 4, further comprising a controller configured to control the motor in response to user input calling for washer fluid.

6. The system of claim 5, wherein the controller is configured to continually measure the liquid level of the washer fluid in the reservoir as the motor drives the piston from the first position to the second position in response to the user input.

7. The system of claim 6, wherein the controller is configured to continuously calibrate to indicate a volume of washer fluid in the reservoir at every position of the piston.

8. The system of claim 4, wherein the piston includes a relief channel extending from the first side to the second side of the piston to allow air on the second side of the piston, above the surface of the washer fluid, to escape to the first side of the piston as the motor drives the piston to meet the surface of the washer fluid.

9. The system of claim 8, wherein a state of the relief channel is actively controlled.

10. The system of claim 4, further comprising one or more bearings disposed on the drive shaft to facilitate rotation of the drive shaft.

11. The system of claim 1, wherein the piston includes one or more sealing surfaces configured to interface with an inner surface of the interior volume to prevent washer fluid from passing from the second side of the piston, around the piston to the first side of the piston.

12. The system of claim 1, wherein the reservoir further includes a fluid valve disposed at the outlet of the reservoir configured to meter the jet of washer fluid at the outlet of the reservoir.

13. The system of claim 1, wherein the reservoir further includes an inlet configured to fluidly communicate a fluid source to the interior volume for filling of the reservoir.

14. The system of claim 1, wherein the at least one wiper arm includes one or more fluid outlets in fluid communication with the fluid line configured to issue the jet of washer fluid from the one or more fluid outlets onto the windshield.

15. A system, comprising:

a wiper system having at least one wiper arm configured to wipe a windshield of a vehicle;

a reservoir configured to hold washer fluid, the reservoir comprising:

an interior volume having an outlet; and a piston configured to force the washer fluid through the outlet to produce a jet of washer fluid at the outlet, wherein the piston includes a first side and a second side opposite the first side of the piston, wherein the first side of the piston is configured to be in contact with free space in the interior volume and the second side of the piston is configured to be in contact with a surface of the washer fluid;

a fluid line fluidly connected between the reservoir and the wiper system configured to provide the jet of washer fluid from the outlet of the reservoir to the at least one wiper arm for spraying onto the windshield; and a motor operatively connected to drive the piston via a drive shaft, the motor configured to rotate the drive shaft to drive the piston along the drive shaft between a first position and a second position, wherein the piston includes a relief channel extending from the first side to the second side of the piston to allow air on the second side of the piston, above the surface of the washer fluid, to escape to the first side of the piston as the motor drives the piston to meet the surface of the washer fluid.

16. The system of claim 15, wherein a state of the relief channel is actively controlled.

* * * * *